United States Patent
Ross et al.

(10) Patent No.: US 9,303,354 B2
(45) Date of Patent: Apr. 5, 2016

(54) LINOLEUM FLOORING

(71) Applicant: Armstrong World Industries, Inc., Lancaster, PA (US)

(72) Inventors: Jeffrey S. Ross, Lancaster, PA (US); Dong Tian, Lancaster, PA (US); Larry W. Leininger, Akron, PA (US); Bennett E. Wallick, Strasburg, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 14/144,973

(22) Filed: Dec. 31, 2013

(65) Prior Publication Data

US 2015/0184334 A1 Jul. 2, 2015

(51) Int. Cl.
*B32B 37/12* (2006.01)
*D06N 1/00* (2006.01)
(Continued)

(52) U.S. Cl.
CPC .. *D06N 1/00* (2013.01); *B32B 7/00* (2013.01); *B32B 7/02* (2013.01); *B32B 7/04* (2013.01); *B32B 7/12* (2013.01); *B32B 9/00* (2013.01); *B32B 9/02* (2013.01); *B32B 9/04* (2013.01); *B32B 9/045* (2013.01); *B32B 19/00* (2013.01); *B32B 21/00* (2013.01); *B32B 21/02* (2013.01); *B32B 27/00* (2013.01); *B32B 27/06* (2013.01); *B32B 27/08* (2013.01); *B32B 27/28* (2013.01); *B32B 27/36* (2013.01); *B32B 37/12* (2013.01); *B32B 38/0036* (2013.01); *B44C 5/00* (2013.01); *B32B 2037/1253* (2013.01); *B32B 2307/7163* (2013.01); *B32B 2451/00* (2013.01); *B32B 2471/00* (2013.01); *E04F 15/107* (2013.01);

(Continued)

(58) Field of Classification Search
CPC ........ B32B 27/00; B32B 27/06; B32B 27/08; B32B 27/28; B32B 27/36; B32B 21/00; B32B 21/02; B32B 19/00; B32B 7/00; B32B 7/02; B32B 7/04; B32B 7/12; B32B 9/00; B32B 9/02; B32B 9/04; B44C 5/00; E04F 15/00; D06N 1/00
See application file for complete search history.

(56) References Cited

U.S. PATENT DOCUMENTS 3,484,335 A * 12/1969 Prucnal et al. ............. 428/317.7
4,312,686 A    1/1982 Smith et al.
(Continued)

FOREIGN PATENT DOCUMENTS

DE    102011105443 A1    12/2012
GB    372962    5/1932
(Continued)

OTHER PUBLICATIONS

Search Report for corresponding EP Application No. 14199437.6, dated Mar. 31, 2015.

*Primary Examiner* — Daniel McNally
(74) *Attorney, Agent, or Firm* — Christina W. Geerlof

(57) ABSTRACT

A linoleum flooring product in one embodiment includes a linoleum substrate and a printed wear layer comprising a decorative indicia. The printed wear layer includes a wear layer and an ink print layer. The linoleum substrate may include a base linoleum layer applied on a backing material, and in some embodiments further includes a visual linoleum layer formed on top of the base linoleum layer. The printed wear layer may be adhesively bonded onto the linoleum substrate. In one embodiment, an ultraviolet curable adhesive may be used. A related method for forming the linoleum flooring product is also provided.

24 Claims, 3 Drawing Sheets

(51) Int. Cl.

| | | |
|---|---|---|
| *B32B 7/00* | (2006.01) | |
| *B32B 7/02* | (2006.01) | |
| *B32B 7/04* | (2006.01) | |
| *B32B 7/12* | (2006.01) | |
| *B32B 9/00* | (2006.01) | |
| *B32B 9/02* | (2006.01) | |
| *B32B 9/04* | (2006.01) | |
| *B32B 19/00* | (2006.01) | |
| *B32B 21/00* | (2006.01) | |
| *B32B 21/02* | (2006.01) | |
| *B32B 27/00* | (2006.01) | |
| *B32B 27/06* | (2006.01) | |
| *B32B 27/08* | (2006.01) | |
| *B32B 27/28* | (2006.01) | |
| *B32B 27/36* | (2006.01) | |
| *B44C 5/00* | (2006.01) | |
| *B32B 38/00* | (2006.01) | |
| *E04F 15/10* | (2006.01) | |
| *E04F 15/16* | (2006.01) | |

(52) U.S. Cl.
CPC .............. *E04F 15/163* (2013.01); *Y10T 156/10* (2015.01); *Y10T 428/24802* (2015.01); *Y10T 428/24868* (2015.01)

(56) References Cited

U.S. PATENT DOCUMENTS

| | | | |
|---|---|---|---|
| 4,421,782 A * | 12/1983 | Bolgiano et al. | 427/520 |
| 5,643,666 A | 7/1997 | Eckart et al. | |
| 6,159,583 A | 12/2000 | Calkins | |
| 6,258,429 B1 | 7/2001 | Nelson | |
| 6,803,110 B2 | 10/2004 | Drees et al. | |
| 2002/0136862 A1* | 9/2002 | Dong et al. | 428/150 |
| 2002/0146954 A1* | 10/2002 | Drees et al. | 442/290 |
| 2003/0134074 A1 | 7/2003 | Scolaro et al. | |
| 2005/0249929 A1* | 11/2005 | Reichwein et al. | 428/211.1 |
| 2007/0278709 A1 | 12/2007 | Dowidat-Eskes et al. | |
| 2008/0057300 A1 | 3/2008 | Paiva et al. | |
| 2009/0053448 A1 | 2/2009 | Paiva et al. | |
| 2010/0276059 A1 | 11/2010 | Tian | |
| 2010/0330372 A1 | 12/2010 | Ludtke et al. | |
| 2011/0097954 A1 | 4/2011 | Bone et al. | |
| 2012/0276348 A1 | 11/2012 | Clausi et al. | |
| 2012/0276381 A1 | 11/2012 | Cypcar | |

FOREIGN PATENT DOCUMENTS

| | | |
|---|---|---|
| WO | 2004/056562 A2 | 7/2004 |
| WO | 2012/175198 | 12/2012 |
| WO | 2012/175199 A1 | 12/2012 |
| WO | WO 2012175199 A1 * | 12/2012 |

* cited by examiner

LINOLEUM FLOORING

FIELD OF THE INVENTION

The present invention relates to flooring system, and more particularly to linoleum flooring systems and related methods for making the same.

BACKGROUND OF THE INVENTION

Linoleum flooring provides a homogeneous floor covering product that is used in a wide range of residential and commercial applications. Linoleum is an environmentally "green" material being naturally anti-bacterial, biodegradable, and made from natural materials like linseed oil, rosin, recycled wood powder, cork dust, limestone, and mineral pigments for color. The linoleum components are mixed, calendered, and bonded to a suitable backing material typically forming rolls of flooring or tiles that are then heat cured for a period of time.

Linoleum is available in a wide range of colors and decorative patterns or designs which may replicate natural materials (e.g. wood, stone, slate, marble, granite, etc.) and/or create various geometric or free-form artistic designs. The decorative design elements are generally formed within the linoleum layers by incorporating additive decorative components (e.g. colored particles, granules, chips, flakes, etc.) arranged in a desired pattern into the linoleum cement during processing. Depending on the complexity and visual effect intended for the decorative design, this approach may sometimes complicate processing and increase manufacturing costs.

An improved decorative linoleum flooring product and method for making the same are desired.

SUMMARY OF THE INVENTION

The present invention provides a linoleum flooring product that includes a printed wear layer comprising a decorative indicia which is laminated onto a previously processed and formed linoleum substrate. Accordingly, the printed wear layer may be independently formed in a separate fabrication process from forming the underlying linoleum substrate. Decorative indicia, which may include without limitation any type of image, wording, pattern, or combination thereof, may be ink pinned either directly onto the wear layer or onto as thin pad coat which is then adhered to the wear layer. The completed printed wear layer in either of the foregoing, constructions is then overlaid and adhesively bonded onto an exposed top surface of the linoleum substrate. In one embodiment, a UV (ultraviolet) curable adhesive may be used. The printed wear layer may be made of a non-linoleum material in some embodiments, such as without limitation thermoplastic polymers, to produce a highly wear resistant hybrid linoleum-polymeric flooring product.

It bears noting that the decorative design or pattern is formed in the wear layer and not physically integrated into the depth of the linoleum substrate structure, and therefore represents a topical surface application of the wear layer with decorative design onto the According to one exemplary embodiment, a method for forming a printed linoleum product includes: providing a linoleum substrate formed in a first fabrication process, the linoleum substrate including at least one linoleum layer bonded to a backing layer; providing a printed wear layer comprising a inked decorative indicia formed in a second fabrication process separate from the first fabrication process, the printed wear layer including a wear layer and an ink print layer; applying an adhesive onto the linoleum substrate; partially curing the adhesive for a first period of time sufficient to produce a tacky condition; laminating the linoleum substrate with partially cured adhesive and the printed wear layer together; and curing the adhesive for a second period of time sufficient to cure the adhesive, wherein the printed wear layer becomes permanently bonded to the linoleum substrate In various embodiments, the printed wear layer may be substantially clear or transparent and be formed of, for example, polyesters, including polyethylene terephthalate, and polyethylene. terephtalate glycol-modified. In some embodiments, the wear layer is a polymeric film produced from polyvinyl chloride, polyester acrylic, polyurethane and combinations thereof.

According to another embodiment, a method for forming a printed, linoleum product includes: providing a linoleum substrate formed in a first fabrication process, the linoleum substrate including at least one linoleum layer bonded to a backing layer: providing a printed wear layer comprising an decorative indicia formed in a second fabrication process separately from the first fabrication process, the printed wear layer including a wear layer and an ink print layer; applying an ultraviolet curable adhesive onto the linoleum substrate; exposing the adhesive to an ultraviolet light source for a period of time sufficient to partially cure the adhesive and produce a tacky condition; laminating the linoleum substrate with partially cured adhesive and the printed wear layer together; and exposing the adhesive to an ultraviolet light source for a period of time sufficient to fully cure the adhesive, wherein the printed wear layer becomes permanently bonded to the linoleum substrate. In various embodiments, the method may further include heating the printed wear layer prior to laminating. In the foregoing or other embodiments, the method may also include heating the linoleum substrate prior to laminating.

A linoleum flooring product according to the present disclosure, which may be produced by the foregoing methods, comprises a hacking layer, a linoleum substrate formed on the backing layer, and a printed wear layer comprising a transparent wear layer and an inked decorative indicia. The printed wear layer is adhesively bonded to the linoleum substrate in this embodiment. The present invention is illustrated with a printed wear layer, but the wear layer can be a transparent or translucent layer without any printing applied on the layer to utilize the aesthetical features of the base linoleum layer.

BRIEF DESCRIPTION OF THE DRAWINGS

The features of the exemplary embodiments of the present invention will be described with reference to the following drawings, where like elements are labeled similarly, and in which.

Figure 1:
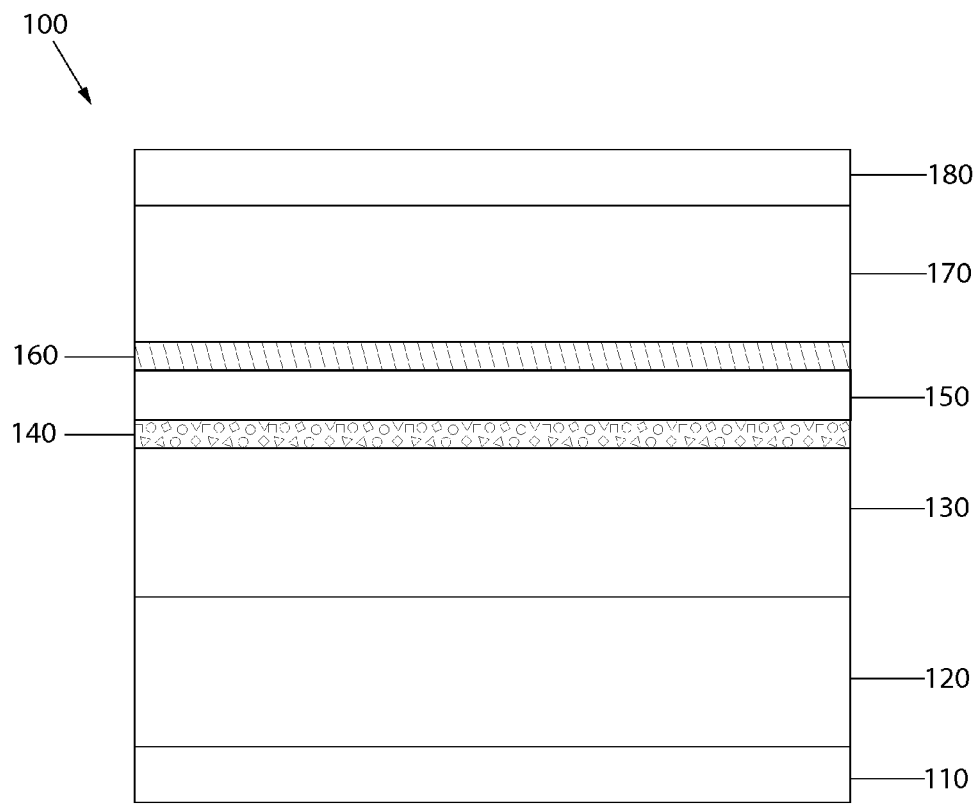
FIG. 1 is a side view of a composite linoleum flooring product according to the present disclosure.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION OF THE EMBODIMENTS

The features and benefits of the invention are illustrated and described herein by reference to exemplary embodiments. This description of exemplary embodiments is intended to be read in connection with the accompanying drawings, which are to be considered part of the entire written description. The disclosure expressly should not be limited to such exemplary embodiments described herein illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above." "below," "up" "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached." "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Figure 2:
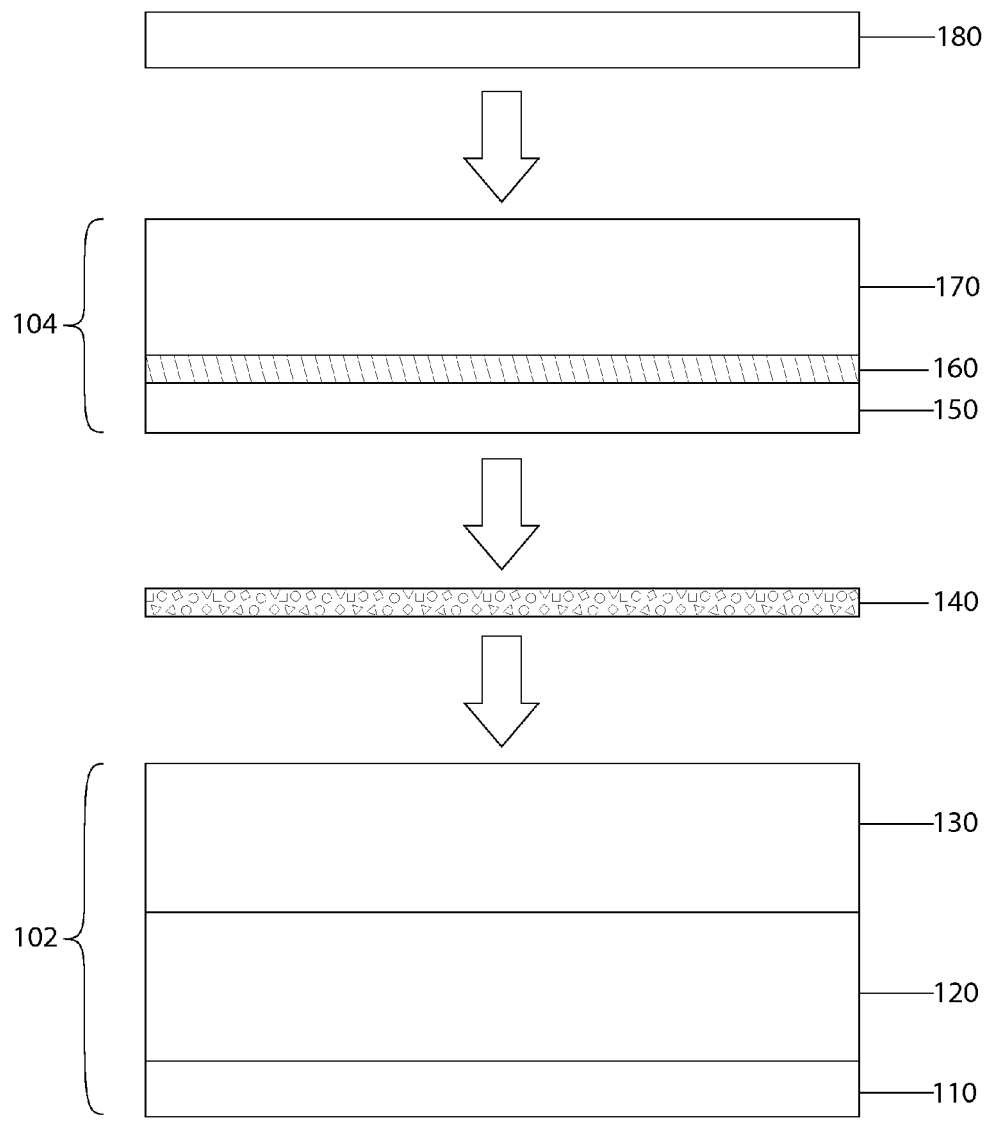
FIG. 2 is an exploded view thereof showing the separately formed linoleum substrate and printed wear layer structures.

FIGS. 1 and 2 depict one exemplary non-limiting embodiment of a linoleum flooring product 100 according to the present disclosure. The flooring product 100 includes linoleum substrate 102 and a printed layer 104. The linoleum substrate 102 and printed layer 104 each form separate self-supporting unitary structures on their own before being bonded together according to the process described herein.

The substrate 102 may be comprised of (from bottom upwards) a backing layer 110, base linoleum layer 120 formed thereon, and a visual linoleum layer 130 (brined thereon. The printed wear layer 104 may be comprised of a bottom pad coat 150, a top wear layer 170, and an ink print layer 160 comprised, of ink printed to form a decorative indicia or design disposed between the pad coat or wear layer. An adhesive layer 140 is provided between the linoleum substrate 102 and printed wear layer 104 to bond the two structures together. In some embodiments, a high performance protective top layer 180 may be formed onto the top wear layer 170 for added protection and durability.

Backing layer 110 may be formed of any suitable backing material, such as for example jute or polyester fabric, canvas, or burlap.

Linoleum layers 120 and 130 are homogeneous material layers which may be comprised of but not limited to linseed oil, rosin, recycled wood powder, cork dust, limestone, and mineral pigments for color. The visual linoleum layer 130 is a patterned layer which may include various decorative additive components such as without limitation colored particles, granules, chips, flakes, or other forms made of linoleum cement or non-linoleum materials such as various linoleum compatible polymers. The decorative additive components may be arranged to form designs that replicate natural materials (e.g. wood, stone, slate, marble, granite, etc.) and/or create various geometric or free-form artistic designs. The decorative additive components may have a different color pigment than the homogenous base color pigment of the linoleum material in layer 130. The decorative additive components elements may be added, mixed, pressed, or otherwise incorporated into the green, linoleum material in various patterns and then laminated to fuse the components in the linoleum structure. Other methods may be used to incorporate and bond the decorative additive components with the linoleum material in the visual linoleum layer 130.

The base linoleum layer 120 may be relatively plain in structure in some embodiments without decorative additive components like the visual linoleum layer 130. Base linoleum layer 120 forms an underlayment with respect to the visual linoleum layer 130. In some embodiments, a single linoleum layer may alternatively be used instead of a dual layer construction. The invention is not limited to either construction.

Base linoleum layer 120 and visual linoleum layer 130 may have representative thicknesses of about 20 mils and 60 mils, respectively.

Processes for forming base and visual linoleum layers and single linoleum layers are well known to those skilled in the art without further elaboration herein.

In an embodiment, the visual linoleum layer 130 may be omitted and the decorative pattern may be provided entirely in the printed wear layer 104, as further described herein. Advantageously, this eliminates the need to fabricate and bond two linoleum layers.

The backing layer 110 and duo linoleum layers 120, 130 or a single layer 120 (if alternatively used) collectively define a linoleum substrate. In one embodiment, the linoleum substrate is formed in a first process separate from a second process of independently forming the printed wear layer 104 before being bonded to the linoleum substrate.

In the embodiment shown in FIGS. 1 and 2, the pad coat 150, ink print layer 160, and wear layer 170 collectively define the printed wear layer 104. Pad coat 150 may be a substantially clear or transparent material, or an opaque material (e.g. white ink). A desired decorative design or pattern may be printed onto the bottom of wear layer 170 which forms the ink print layer 160. The ink print layer 160 is preferably disposed between the pad coat 150 and wear layer 170. The pad coat 150 has a thickness less than the wear layer 170.

Any suitable type ink may be used for printing the pad coat 150 and ink print layer 160. Some non-limiting examples include non-PVC inks such as nitrous cellulose, UV (ultraviolet) curable ink, and acrylic ink. Preferably, the pad coat 150 and ink print layer 160 are dried before bonding the printed wear layer 140 onto the linoleum substrate 102.

The wear layer 170 protects the pruned pad coat 150 from foot or equipment traffic in the finished linoleum flooring composite. In one embodiment, the wear layer 170 may be formed from PETG (Polyethylene Terephtalate Glycol-Modified). PETG is a naturally clear thermoplastic with high transparency that can be extruded into sheets of varying thicknesses. Depending on thicknesses used, PETG can vary from semi-rigid to rigid and advantageously is lightweight. PETG is relatively strong and impact-resistant, as well as an effective barrier to alcohol and solvents making this material ideal for a wear layer. The PETG material may also be pigmented and colored during processing and still retain its transparency. This expands aesthetic design possibilities. In the present printed wear layer 104 construction being described, a wear layer 170 formed of PETG may have a representative non-limiting thickness of about 0.5 mm. A representative non-limiting range of thicknesses that may be used is from about and including 2 mils (0.051 mm) to 20 mils (0.5 mm).

Depending on the desired decorative designs selected for the linoleum product 100, the printed wear layer 104 may entirely obviate the need for a visible linoleum layer 130 wherein the decorative design is provided solely by the printed wear layer. This provides an advantage over standard linoleum because a single pigmented base linoleum layer 120 may be used instead of typically two layers—a first base layer 120 and a second visible layer 130 having the decorative pattern. Accordingly, the printed wear layer 104 may have designs that replicate natural materials (e.g. wood, stone, slate, marble, granite, etc.) and/or create various geometric or free-form artistic designs. Advantageously, the printed wear layer 104 linoleum composite construction is less expensive from a fabrication standpoint than using a visible wear layer 130 because various colored or patterned additive decorative components (e.g. colored particles, granules, chips, flakes, etc.) do not need to be formed in a linoleum layer, but rather are provided in the printed wear layer 104 bonded to the linoleum base layer. It should be noted that the second visible linoleum layer 130 may still be used if desired, however, to expand the visual decorative design possibilities and add depth to the linoleum flooring product 100.

Top protective layer 180 formed on wear layer 170 may be made of a high performance UV curable coating in one non-limiting example. The top protective layer may have a representative thickness of about 0.02 mm. In some embodiments, multiple top protective layers 180 may be provided for added durability. The top protective layer 180 may be applied onto the wear layer 170 in the linoleum flooring fabrication facility after the printed wear layer 104 is bonded to the linoleum substrate 102.

Figure 3:
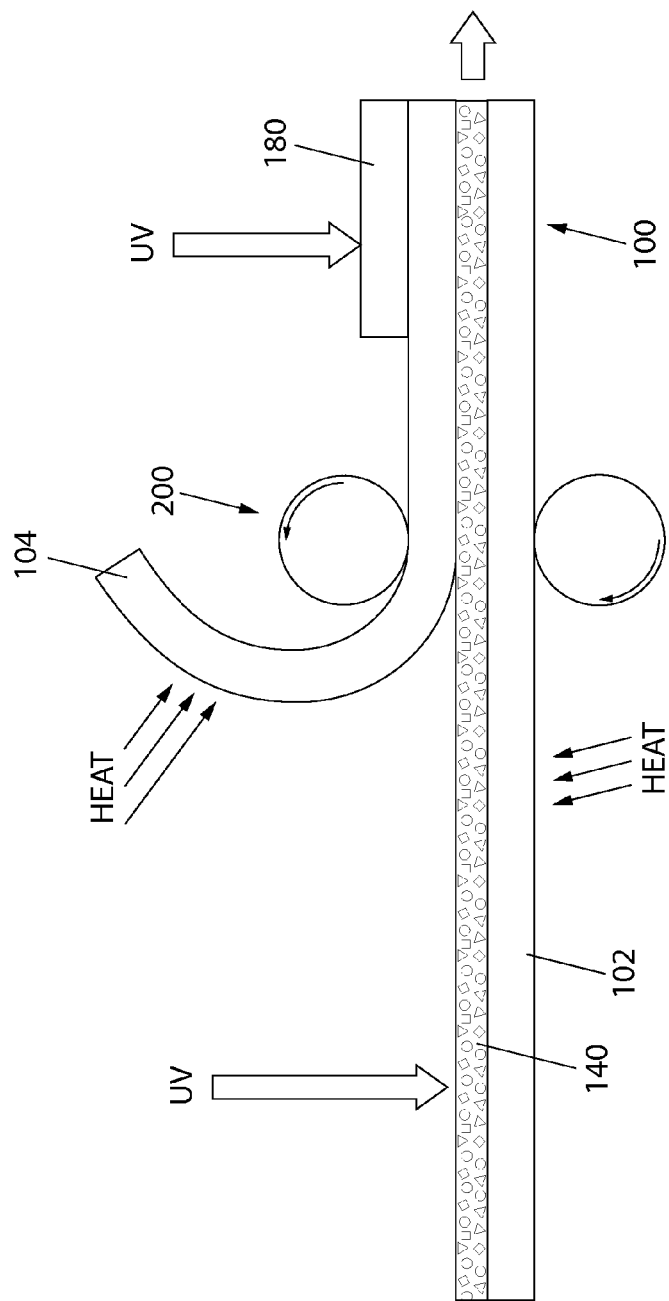
FIG. 3 is a schematic diagram of a process for bonding the printed wear layer to the linoleum substrate.

An exemplary method for forming a printed linoleum flooring product 100 will now be described with reference to FIGS. 1-3. FIG. 3 is a schematic diagram of a portion of the linoleum flooring product formation process. The wear layer 170 in this exemplary method is made of PETG. The method or process may employ a UV (ultraviolet) curable adhesive 140 to adhesively bond the printed wear layer 104 onto the linoleum substrate 102. Accordingly, adhesive 140 may be cured by a photochemical process. Examples of suitable UV curable adhesive that may be used include UV curable pressure sensitive adhesives. An exemplary suitable adhesive is a polyester pressure sensitive adhesive produced from 1,3-propanediol, and dicarboxylic acids, including aliphatic dicarboxylic acids, such as sebacic acid; aromatic dicarboxylic acids, such as terephthalic acid, isoplithalic acids and phthalic anhydride; and mixtures thereof. Curing of the UV curable adhesive may be performed at ambient room temperatures in some embodiments. In this embodiment, a two-step UV curing process is used as further described below to increase adhesive bonding strength. Suitable adhesives for the present invention are disclosed in a provisional patent application, U.S. Ser. No.61/922,263, that is being filed concurrently, which is herein incorporated by reference.

The linoleum substrate 102 may be formed in as first process. In one embodiment, the base and visual linoleum layers 120, 130 are formed and laminated together in a mariner which is well known in the art. In alternative embodiments described herein in which a single linoleum base layer 120 also serves as the visual linoleum layer, that single linoleum base layer 120 would instead be formed on the backing layer 110. Additional heat curing or other processing steps may be performed as needed to prepare the linoleum substrate 102 for receiving and bonding the printed wear layer 104 thereon.

The printed wear layer 104 as described above formed by a second independent process is provided, which includes the desired printed decorative indicia. The printed wear layer 104 may include printed pad coat 150 or wear layer 170 may be directly printed without use of the pad coat.

A UV-curable liquid adhesive 140 is first applied directly (by roller coating or another suitable) method onto the linoleum substrate 102, such as on visual linoleum layer 130 in the two linoleum layer substrate construction or on base layer 120 in a single linoleum layer construction. In one, the liquid adhesive 140 may be applied to a thickness of about 2 mils; however, any suitable application thickness may be used to provide satisfitctory bonding strength.

The linoleum substrate 102 with adhesive 140 is then passed under an artificial UV light source in a first partial UV curing step for a first period of time sufficient to only partially cure the adhesive to the point where the adherence exhibits a tacky and pressure sensitive condition or quality so that objects (like the printed wear layer 104) will readily stick to the adhesive. In one non-limiting embodiment, a UVA light source may be used having, an energy output of about 500 mJ (millijoules). Any suitable artificial UV light source may be used.

Next, the printed wear layer 104 is applied and positioned onto the partially cured and tacky adhesive 140 layer on the linoleum substrate 102 for lamination. In one embodiment, the lamination may be performed in a roll-type laminator 200 comprising a spaced apart pair of rotating rolls or cylinders defining a gap or nib between them through which the printed wear layer 104 and linoleum substrate 102 passes. The nib is sized to sufficiently press and laminate the printed wear layer 104 and substrate 102 together.

In one embodiment, the linoleum substrate 102 and printed wear layer 104 are each heated before the foregoing lamination step. Heating of the linoleum substrate 102 improves bonding to the printed wear layer 104 through the laminator or calender 200. The linoleum substrate 102 may be heated using radiant heaters positioned proximate to the substrate. The linoleum substrate 102 may be heated to a temperature between about 160 degrees F. to 200 degrees F. immediately before lamination.

Because the PETG wear layer 170 may be somewhat semi-rigid in structure due to the nature of PETG, heating the wear layer 170 advantageously increases its flexibility and allows it to more readily conform to the linoleum substrate 102 during the laminating process to improve handling and lamination results. In one embodiment, the printed wear layer 104 may be passed under radiant heaters positioned proximate to the surface of the printed wear layer 104 and immediately upstream of and before the laminator rolls. The printed wear layer 104 may be heated to a temperature between about 160 degrees F. to 200 degrees F. immediately before lamination.

Following the laminating process, a second full UV curing step is performed wherein the entire laminated linoleum substrate 102 and printed wear layer 104 composite structure is passed under a UV light source for as second period of time sufficient to fully cure the adhesive 140, thereby bonding the linoleum-printed wear layer composite together. The adhesive now exhibits a dried and hardened condition or quality. In one embodiment, a UVA light source may be used having an energy output of about 500 mJ (millijoules). In representative examples, an energy output from the UVA light source used may be without limitation in a range of about and including 300 to 1200 mJ. A UVA light source having a longer wavelength than used in the first UV treatment may be used to provide sufficient penetration through printed wear layer 104 to properly cure the adhesive and bond the wear layer to the linoleum substrate.

One or more top protective layer(s) 180 may next be formed on wear layer 170 for added protection and durability. Such protective layers can be formed from a UV curable top coat composition available in the art for example as disclosed in U.S. Pat. No. 6,916,547. The protective layer composition can be applied on top of the printed wear layer 104 after the printed wear layer 104 is laminated, but before the laminate with the wear layer 104 is subjected to the second UV treatment such that the adhesive and the protective composition can be simultaneously cured during the second UV treatment process.

The linoleum product LOU may have any suitable overall thickness. Representative non-limiting thicknesses for linoleum flooring may range generally from about 2.5 mm-3.2 mm in some embodiments.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components, and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A method for forming a printed linoleum product, the method comprising:
    providing a linoleum substrate formed in a first fabrication process, the linoleum substrate including at least one linoleum layer bonded to a backing layer;
    providing a printed wear layer comprising a inked decorative indicia formed in a second fabrication process separate from the first fabrication process, the printed wear layer including a wear layer, which is substantially transparent, and an ink print layer;
    applying a UV-curable adhesive onto the linoleum substrate;
    partially curing the adhesive for a first period of time sufficient to produce a tacky condition by treating the adhesive with a first UV light source;
    laminating the linoleum substrate with partially cured adhesive and the printed wear layer together to form a laminate; and
    curing the adhesive for a second period of time sufficient to cure the adhesive by treating the laminate with a second UV light source exposed through the printed wear layer, wherein the printed wear layer becomes permanently bonded to the linoleum substrate.

2. The method of claim 1, further comprising a step of forming a high performance protective top layer on top of the primed wear layer for durability.

3. The method of claim 2, wherein the high performance protective top layer is formed of a high performance UV curable coating.

4. The method of claim 3, wherein the printed wear layer comprises a wear layer formed of polyethylene terephtalate glycol-modified.

5. The method of claim 1, wherein the linoleum substrate includes a base linoleum layer and a visible linoleum layer formed on top of the base linoleum layer.

6. The method of claim 5, wherein the visible linoleum layer includes additive decorative components selected from the group consisting of colored particles, granules, chips, and flakes.

7. The method of claim 1, wherein the printed wear layer comprises a wear layer formed of polyethylene terephtalate glycol-modified.

8. The method of claim 1, wherein the decorative indicia is disposed below the wear layer and visible through the wear layer.

9. The method of claim 1, further comprising heating the linoleum substrate prior to laminating.

10. The method of claim 1, further comprising a pad layer ink printed with the decorative indicia, the printed pad layer being bonded to a bottom surface of the wear layer.

11. The method of claim 1, further comprising heating the printed wear layer prior to laminating.

12. The method of claim 1, wherein the curing steps include exposing the adhesive to ultraviolet light.

13. A method for forming a printed linoleum product, the method comprising:
    providing a linoleum substrate formed in a first fabrication process, the linoleum substrate including at least one linoleum layer bonded to a backing layer;
    providing a printed wear layer comprising an decorative indicia formed in a second fabrication process separately from the first fabrication process, the printed wear layer including a wear layer, which is substantially transparent, and an ink print layer;
    applying an ultraviolet curable adhesive onto the linoleum substrate;
    exposing the adhesive to a first ultraviolet light source for a period of time sufficient to partially cure the adhesive and produce a tacky condition;
    laminating the linoleum substrate with partially cured adhesive and the printed wear layer together to form a laminate; and
    exposing the adhesive to a second ultraviolet light source directed to the printed wear layer of the laminate for a period of time sufficient to fully cure the adhesive, wherein the printed wear layer becomes permanently bonded to the linoleum substrate.

14. The method of claim 13, further comprising a step of forming a high performance protective top layer on top of the printed wear layer fear durability.

15. The method of claim 14, wherein the high performance protective top layer is formed of polyester based acrylated urethane and the printed wear layer comprises a wear layer formed of polyethylene terephtalate glycol-modified.

16. The method of claim 13, wherein the linoleum substrate includes a base linoleum layer and a visible linoleum layer formed on top of the base linoleum layer.

17. The method of claim 16, wherein the visible linoleum layer includes additive decorative components selected from the group consisting of colored particles, granules, chips, and flakes.

18. The method of claim 13 further comprising heating the printed wear layer prior to laminating.

19. The method of claim 13, further comprising heating the linoleum substrate prior to laminating.

20. The method of claim 13, wherein the printed wear layer comprises a wear layer formed of polyethylene terephtalate glycol-modified.

21. The method of claim 13, wherein the decorative indicia is disposed below the wear layer and visible through the wear layer.

22. The method of claim 13, further comprising a pad layer ink printed with the decorative indicia, the printed pad layer being bonded to a bottom surface of the wear layer.

23. The method of claim 13, wherein an ultraviolet curable ink is used to create the decorative indicia.

24. The method of claim 13, wherein the linoleum layer includes only a single linoleum base layer without additive decorative components, the printed wear layer being adhesively bonded directly to the base layer.

* * * * *